US012743996B2

(12) United States Patent
Shin et al.

(10) Patent No.: US 12,743,996 B2
(45) Date of Patent: *Sep. 22, 2026

(54) PIXEL CIRCUIT AND DISPLAY DEVICE HAVING THE SAME

(71) Applicant: Samsung Display Co., Ltd., Yongin-Si (KR)

(72) Inventors: Kyoungju Shin, Hwaseong-si (KR); Dohyun Kang, Hwaseong-si (KR); Yangsoo Kim, Yongin-si (KR); Jungkook Park, Cheonan-si (KR); Moonsang Hwang, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/264,875

(22) Filed: Jul. 10, 2025

(65) Prior Publication Data

US 2025/0336348 A1 Oct. 30, 2025

Related U.S. Application Data

(63) Continuation of application No. 17/968,571, filed on Oct. 18, 2022, now Pat. No. 12,387,657.

(30) Foreign Application Priority Data

Dec. 9, 2021 (KR) ........................ 10-2021-0175836

(51) Int. Cl.
*G09G 3/32* (2016.01)

(52) U.S. Cl.
CPC ....... *G09G 3/32* (2013.01); *G09G 2300/0426* (2013.01); *G09G 2300/0842* (2013.01);
(Continued)

(58) Field of Classification Search
CPC ............. G09G 2310/0278; G09G 3/32; G09G 2300/0842; G09G 2300/0426;
(Continued)

(56) References Cited

U.S. PATENT DOCUMENTS 10,977,997 B2 4/2021 Kim et al.
2013/0120341 A1 5/2013 Kasai et al.
(Continued)

FOREIGN PATENT DOCUMENTS

CN 210896559 U 6/2020
KR 10-2018-0114981 A 10/2018
(Continued)

OTHER PUBLICATIONS

Korean Notice of Allowance corresponding to Application No. 10-2021-0175836 and issued on Sep. 19, 2025, 9 pages.

*Primary Examiner* — Muhammad N Edun
(74) *Attorney, Agent, or Firm* — Innovation Counsel LLP

(57) ABSTRACT

A pixel circuit includes a light emitting element, a driving transistor, a first emission transistor applying a first power voltage to the driving transistor in response to a first emission signal, a second emission transistor applying the driving current to the light emitting element in response to a second emission signal, a first initialization transistor applying a first initialization voltage to an anode electrode of the light emitting element in response to the second emission signal, a data write transistor, a compensation transistor, a second initialization transistor, and a storage capacitor. A first off-duty ratio which is a ratio of a high voltage level period of the first emission signal in one frame is determined according to a set luminance level, and a second off-duty ratio which is a ratio of a high voltage level period of the second emission signal in the one frame is fixed.

20 Claims, 8 Drawing Sheets

(52) U.S. Cl.
CPC ............... *G09G 2310/0278* (2013.01); *G09G 2320/0626* (2013.01)

(58) Field of Classification Search
CPC ... G09G 2320/0626; G09G 2300/0819; G09G 2310/08; G09G 2300/0852; G09G 3/3233; G09G 2320/045; G09G 2300/0861; G09G 2320/064; G09G 3/30; G09G 2340/0435; G09G 2310/0267; G09G 2310/0275; G09G 5/003; G09G 2300/08
See application file for complete search history.

(56) References Cited

U.S. PATENT DOCUMENTS

| | | | | |
|---|---|---|---|---|
| 2014/0118409 | A1* | 5/2014 | Jun | G09G 3/3233 345/690 |
| 2014/0320545 | A1 | 10/2014 | Jean | |
| 2015/0138258 | A1 | 5/2015 | Lee et al. | |
| 2017/0345367 | A1 | 11/2017 | Ka et al. | |
| 2018/0293939 | A1 | 10/2018 | Kim et al. | |
| 2021/0134210 | A1 | 5/2021 | In et al. | |
| 2021/0193048 | A1* | 6/2021 | Lim | G09G 3/3266 |
| 2021/0295784 | A1 | 9/2021 | Kim et al. | |
| 2021/0408165 | A1 | 12/2021 | Tabatake et al. | |
| 2022/0180819 | A1 | 6/2022 | Ono et al. | |
| 2022/0230592 | A1 | 7/2022 | Zhao | |
| 2022/0301504 | A1 | 9/2022 | Wang et al. | |
| 2022/0319417 | A1 | 10/2022 | Liu et al. | |
| 2022/0343862 | A1 | 10/2022 | Cheng et al. | |
| 2022/0344409 | A1 | 10/2022 | Lee | |

FOREIGN PATENT DOCUMENTS

| | | | |
|---|---|---|---|
| KR | 10-2020-0019306 | A | 2/2020 |
| KR | 10-2021-0018614 | A | 2/2021 |
| KR | 10-2021-0035370 | A | 4/2021 |
| KR | 10-2021-0054114 | A | 5/2021 |
| KR | 10-2021-0055146 | A | 5/2021 |
| KR | 10-2021-0085540 | A | 7/2021 |
| WO | 2022222134 | A1 | 10/2022 |

* cited by examiner

PIXEL CIRCUIT AND DISPLAY DEVICE HAVING THE SAME

PRIORITY STATEMENT

This application is a continuation application of U.S. patent application Ser. No. 17/968,571 filed on Oct. 18, 2022, which claims priority under 35 U.S.C. § 119 to Korean Patent Application No. 10-2021-0175836, filed on Dec. 9, 2021, in the Korean Intellectual Property Office KIPO, the contents of which are herein incorporated by reference in their entireties.

BACKGROUND

1. Field

Embodiments of the present inventive concept relate to a display device. More particularly, embodiments of the present inventive concept relate to a pixel circuit in which luminance is adjusted according to a set luminance level and a display device including the pixel circuit.

2. Description of the Related Art

Generally, a display device may include a display panel, a driving controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The driving controller may control the gate driver and the data driver.

In order to control a luminance, a dimming technique for changing a grayscale voltage according to a set luminance level, a dimming technique for adjusting a length of a light emitting period (or a light non-emitting period) in one frame according to the set luminance level, etc. are developed. When the dimming technique for adjusting the length of the light emitting period is used, since the display device does not store the length of the light emitting period corresponding to all luminance levels, the length of the light emitting period corresponding to representative luminance levels may be stored and the length of the light emitting period corresponding to remaining luminance levels may be determined through an interpolation method. In this case, a luminance inversion phenomenon may occur at luminance levels other than the representative luminance levels.

SUMMARY

Embodiments of the present inventive concept provide a pixel circuit to which a first emission signal having a variable off-duty ratio and a second emission signal having a fixed off-duty ratio are applied.

Embodiments of the present inventive concept also provide a display device adjusting a voltage application time in which a first power voltage is applied to a driving transistor, and fixing a light emitting time in which a light emitting element emits light and a light emitting element initialization time in which an anode electrode of the light emitting element is initialized.

According to embodiments of the present inventive concept, a pixel circuit may include a light emitting element, a driving transistor generating a driving current, a first emission transistor applying a first power voltage to the driving transistor in response to a first emission signal, a second emission transistor applying the driving current to the light emitting element in response to a second emission signal, a first initialization transistor applying a first initialization voltage to an anode electrode of the light emitting element in response to the second emission signal, a data write transistor applying a data voltage to the driving transistor in response to a write gate signal, a compensation transistor connecting a first electrode of the driving transistor and a control electrode of the driving transistor in response to a compensation gate signal, a second initialization transistor applying a second initialization voltage to the control electrode of the driving transistor in response to an initialization gate signal, and a storage capacitor including a first electrode connected to the control electrode of the driving transistor and a second electrode receiving the first power voltage. A first off-duty ratio which is a ratio of a high voltage level period of the first emission signal in one frame may be determined according to a set luminance level. A second off-duty ratio which is a ratio of a high voltage level period of the second emission signal in the one frame may be fixed.

In an embodiment, the second emission transistor may be a p-type transistor, and the first initialization transistor may be an n-type transistor.

In an embodiment, the driving transistor may include the first electrode connected to a first node, a second electrode connected to a second node, and the control electrode connected to a third node, the first emission transistor may include a first electrode connected to the second node, a second electrode receiving the first power voltage, and a control electrode receiving the first emission signal, the second emission transistor may include a first electrode connected to a fourth node, a second electrode connected to the first node, and a control electrode receiving the second emission signal, the first initialization transistor may include a first electrode receiving the first initialization voltage, a second electrode connected to the fourth node, and a control electrode receiving the second emission signal, the data write transistor may include a first electrode receiving the data voltage, a second electrode connected to the second node, and a control electrode configured to receive the write gate signal, the compensation transistor may include a first electrode connected to the third node, a second electrode connected to the first node, and a control electrode receiving the compensation gate signal, the second initialization transistor may include a first electrode receiving the second initialization voltage, a second electrode connected to the third node, and a control electrode receiving the initialization gate signal, and the light emitting element may include the anode electrode connected to the fourth node and a cathode electrode receiving a second power voltage.

In an embodiment, the pixel circuit may further include a boost capacitor including a first electrode receiving the write gate signal and a second electrode connected to the control electrode of the driving transistor.

In an embodiment, the write gate signal may rise from a low voltage level to a high voltage level in a low voltage level period of the compensation gate signal.

In an embodiment, the driving transistor may further include a lower electrode receiving a direct current voltage.

In an embodiment, the direct current voltage may be a same as the first power voltage.

In an embodiment, a number of times the first emission signal rises from a low voltage level to a high voltage level in the one frame may be a same as a number of times the second emission signal rises from the low voltage level to the high voltage level in the one frame.

In an embodiment, a number of times the first emission signal rises from a low voltage level to a high voltage level in the one frame may be less than a number of times the second emission signal rises from the low voltage level to the high voltage level in the one frame.

In an embodiment, the second emission signal may rise from the low voltage level to the high voltage level when the first emission signal rises from the low voltage level to the high voltage level.

According to embodiments of the present inventive concept, the display device may include a display panel including a pixel circuit, a data driver applying a data voltage to the pixel circuit, a gate driver applying a write gate signal, a compensation gate signal, and an initialization gate signal, an emission driver applying a first emission signal and a second emission signal, and a driving controller controlling the display panel, the data driver, the gate driver, and the emission driver. The driving controller may adjust voltage application time in which a first power voltage is applied to a driving transistor included in the pixel circuit according to a set luminance level, and fix light emitting time in which the light emitting element included in the pixel circuit emits light and light emitting element initialization time in which an anode electrode of the light emitting element is initialized.

In an embodiment, the pixel circuit may include the light emitting element, the driving transistor generating a driving current, a first emission transistor applying the first power voltage to the driving transistor in response to the first emission signal, a second emission transistor applying the driving current to the light emitting element in response to the second emission signal, a first initialization transistor applying a first initialization voltage to the anode electrode of the light emitting element in response to the second emission signal, a data write transistor applying the data voltage to the driving transistor in response to the write gate signal, a compensation transistor connecting a first electrode of the driving transistor and a control electrode of the driving transistor in response to the compensation gate signal, a second initialization transistor applying a second initialization voltage to the control electrode of the driving transistor in response to the initialization gate signal, and a storage capacitor including a first electrode connected to the control electrode of the driving transistor and a second electrode receiving the first power voltage.

In an embodiment, the driving controller may perform a display scan operation and a self-scan operation, the data voltage may be written to the storage capacitor when the display scan operation is performed, and the data write transistor, the compensation transistor, and the second initialization transistor may be turned off when the self-scan operation is performed.

In an embodiment, the driving controller may adjust the voltage application time by determining a first off-duty ratio which is a ratio of a high voltage level period of the first emission signal in one frame according to the set luminance level, and fix the light emitting time and the light emitting element initialization time by fixing a second off-duty ratio which is a ratio of a high voltage level period of the second emission signal in the one frame.

In an embodiment, the second emission transistor may be a p-type transistor, and the first initialization transistor may be an n-type transistor.

In an embodiment, a number of times the first emission signal rises from a low voltage level to a high voltage level in the one frame may be a same as a number of times the second emission signal rises from the low voltage level to the high voltage level in the one frame.

In an embodiment, a number of times the first emission signal rises from a low voltage level to a high voltage level in the one frame may be less than a number of times the second emission signal rises from the low voltage level to the high voltage level in the one frame.

In an embodiment, the second emission signal may rise from the low voltage level to the high voltage level when the first emission signal rises from the low voltage level to the high voltage level.

In an embodiment, the pixel circuit further may include a boost capacitor including a first electrode receiving the write gate signal and a second electrode connected to the control electrode of the driving transistor, and the write gate signal may rise from a low voltage level to a high voltage level in a low voltage level period of the compensation gate signal.

In an embodiment, the driving transistor may further include a lower electrode receiving a direct current voltage.

Therefore, a light emitting element initialization time in which an anode electrode of the light emitting element is initialized may be fixed by including a light emitting element, a driving transistor configured to generate a driving current, a first emission transistor configured to apply a first power voltage to the driving transistor in response to a first emission signal, a second emission transistor configured to apply the driving current to the light emitting element in response to a second emission signal, a first initialization transistor configured to apply a first initialization voltage to an anode electrode of the light emitting element in response to the second emission signal, a data write transistor configured to apply a data voltage to the driving transistor in response to a write gate signal, a compensation transistor configured to connect a first electrode of the driving transistor and a control electrode of the driving transistor in response to a compensation gate signal, a second initialization transistor configured to apply a second initialization voltage to the control electrode of the driving transistor in response to an initialization gate signal, and a storage capacitor including a first electrode connected to the control electrode of the driving transistor and a second electrode configured to receive the first power voltage in the pixel circuit, determining a first off-duty ratio which is a ratio of a high voltage level period of the first emission signal in one frame according to a set luminance level, and fixing a second off-duty ratio which is a ratio of a high voltage level period of the second emission signal in the one frame.

In addition, the display device may prevent a luminance inversion phenomenon that occurs due to a change in the light emitting element initialization time by including the pixel circuit.

However, the effects of the present inventive concept are not limited to the above-described effects, and may be variously expanded without departing from the spirit and scope of the present inventive concept.

DETAILED DESCRIPTION OF THE INVENTIVE CONCEPT

Hereinafter, the present inventive concept will be explained in detail with reference to the accompanying drawings.

Figure 1:
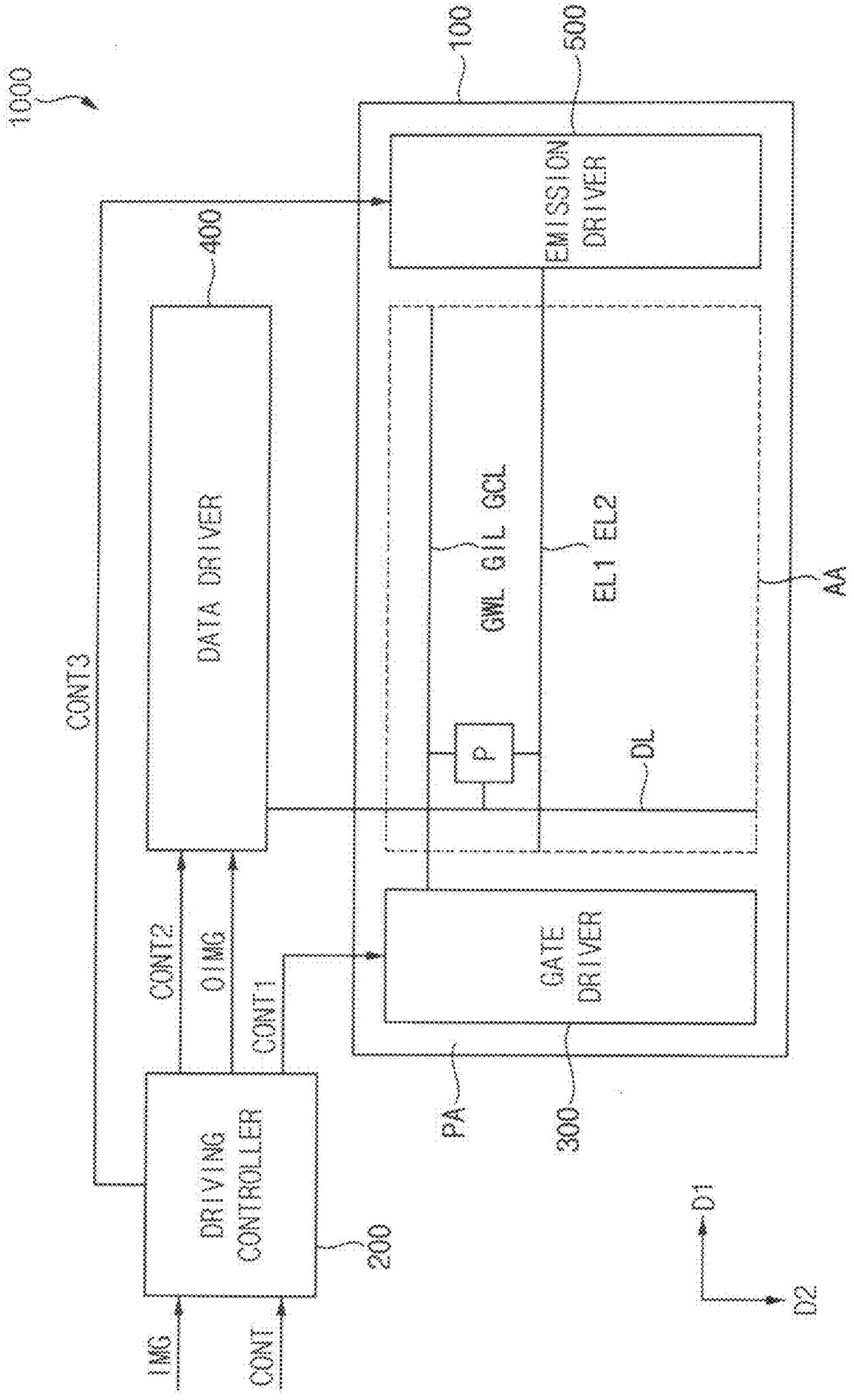
FIG. 1 is a block diagram illustrating a display device according to embodiments of the present inventive concept.
Figure 2:
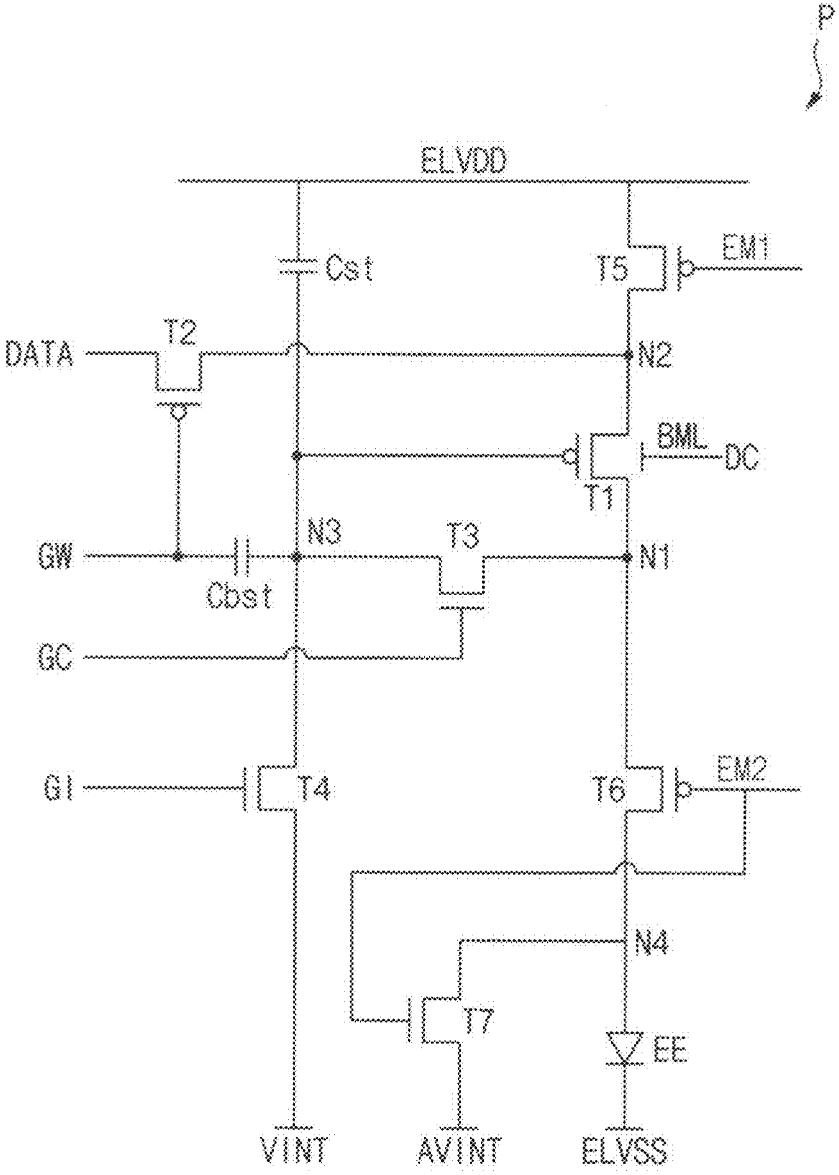
FIG. 2 is a circuit diagram illustrating an example of a pixel circuit of the display device of FIG. 1.

FIG. 1 is a block diagram illustrating a display device 1000 according to embodiments of the present inventive concept, and FIG. 2 is a circuit diagram illustrating an example of a pixel circuit P of the display device 1000 of FIG. 1.

Referring to FIGS. 1 and 2, the display device 1000 may include a display panel 100, a driving controller 200, a gate driver 300, a data driver 400, and an emission driver 500. In an embodiment, the driving controller 200 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GWL, GCL, and GIL, a plurality of data lines DL, a plurality of emission lines EL1 and EL2 and a plurality of the pixels P electrically connected to the data lines DL, the gate lines GWL, GCL, and GIL, and the emission lines EL1 and EL2. The gate lines GWL, GCL, and GIL, and the emission lines EL1 and EL2 may extend in a first direction D1 and the data lines DL may extend in a second direction D2 crossing the first direction D1.

The driving controller 200 may receive input image data IMG and an input control signal CONT from a host processor (e.g., a graphic processing unit; GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, and a third control signal CONT3, and output image data OIMG based on the input image data IMG and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may generate the third control signal CONT3 for controlling operation of the emission driver 500 based on the input control signal CONT and output the third control signal CONT3 to the emission driver 500. The third control signal CONT3 may include a vertical start signal and a emission clock signal.

The driving controller 200 may receive the input image data IMG and the input control signal CONT, and generate the output image data OIMG. The driving controller 200 may output the output image data OIMG to the data driver 400.

The gate driver 300 may generate gate signals GW, GC, and GI for driving the gate lines GWL, GCL, and GIL, respectively, in response to the first control signal CONT1 input from the driving controller 200. The gate driver 300 may output the gate signals GW, GC, and GI to the gate lines GWL, GCL, and GIL. For example, the gate driver 300 may sequentially output the gate signals GW, GC, and GI to the gate lines GWL, GCL, and GIL. In an embodiment, the gate lines GWL, GCL, and GIL may include write gate lines GWL, initialization gate lines GIL, and compensation gate lines GCL. For example, the gate driver 300 may output a write gate signal GW to the write gate lines GWL. For example, the gate driver 300 may output a compensation gate signal GC to the compensation gate lines GCL. For example, the gate driver 300 may output an initialization gate signal GI to the initialization gate lines GIL.

The data driver 400 may receive the second control signal CONT2 and the output image data OIMG from the driving controller 200. The data driver 400 may convert the output image data OIMG into data voltages having an analog type. The data driver 400 may output the data voltage to the data lines DL.

The emission driver 500 may generate emission signals EM1 and EM2 for driving the emission lines EL1 and EL2 in response to the third control signal CONT3 input from the driving controller 200. The emission driver 500 may output the emission signals EM1 and EM2 to the emission lines EL1 and EL2. For example, the emission driver 500 may sequentially output the emission signals EM1 and EM2 to the emission lines EL1 and EL2. In an embodiment, the emission lines EL1 and EL2 may include first emission lines EL1 and second emission lines EL2. For example, the emission driver 500 may output the first emission signal EM1 to the first emission lines EL1. For example, the emission driver 500 may output the second emission signal EM2 to the second emission lines EL2.

Referring to FIG. 2, the pixel circuit P may include a light emitting element EE, a driving transistor T1 generating a driving current, a first emission transistor T5 applying a first power voltage ELVDD to the driving transistor T1 in response to a first emission signal EM1, a second emission transistor T6 applying the driving current to the light emitting element EE in response to a second emission signal EM2, a first initialization transistor T7 applying a first initialization voltage AVINT to an anode electrode (i.e., a fourth node N4) of the light emitting element EE in response to the second emission signal EM2, a data write transistor T2 applying a data voltage DATA to the driving transistor T1 in response to a write gate signal GW, a compensation transistor T3 connecting a first electrode (i.e., a first node N1) of the driving transistor T1 and a control electrode (i.e., a third node N3) of the driving transistor T1 in response to a compensation gate signal GC, a second initialization transistor T4 applying a second initialization voltage VINT to the control electrode of the driving transistor T1 in response to an initialization gate signal GI, and a storage capacitor Cst including a first electrode connected to the control electrode of the driving transistor T1 and a second electrode receiving the first power voltage ELVDD.

For example, the driving transistor T1 may include the first electrode connected to the first node N1, a second electrode connected to the second node N2, and the control electrode connected to the third node N3, the first emission transistor T5 may include a first electrode connected to the second node N2, a second electrode receiving the first power voltage ELVDD, and a control electrode receiving the first emission signal EM1, the second emission transistor T6 may include a first electrode connected to the fourth node N4, a second electrode connected to the first node N1, and a control electrode receiving the second emission signal EM2, the first initialization transistor T7 may include a first electrode receiving the first initialization voltage VAINT, a second electrode connected to the fourth node N4, and a control electrode receiving the second emission signal EM2, the data write transistor T2 may include a first electrode receiving the data voltage DATA, a second electrode connected to the second node N2, and a control electrode receiving the write gate signal GW, the compensation transistor T3 may include a first electrode connected to the third node N3, a second electrode connected to the first node N1, and a control electrode receiving the compensation gate signal GC, the second initialization transistor T4 may include a first electrode receiving the second initialization voltage VINT, a second electrode connected to the third node N3, and a control electrode receiving the initialization gate signal GI, and the light emitting element EE may include the anode electrode connected to the fourth node N4 and a cathode electrode receiving a second power voltage ELVSS.

In an embodiment, the second emission transistor T6 is a p-type transistor, and the first initialization transistor T7 is an n-type transistor. For example, the second emission transistor T6 may be a low temperature poly-silicon (LTPS) thin film transistor. For example, the first initialization transistor T7 may be an oxide thin film transistor. Accordingly, the first initialization transistor T7 may be turned off when the second emission transistor T6 is turned on, and the first initialization transistor T7 may be turned on when the second emission transistor T6 is turned off. That is, when the light emitting element EE emits light (i.e., the driving current is applied to the light emitting element EE), the anode electrode of the light emitting element EE is not initialized (i.e., the first initialization voltage AVINT is not applied to the anode electrode of the light emitting element EE), and the light emitting element EE may not emit light when the anode electrode of the light emitting element EE is initialized.

In an embodiment, as shown in FIG. 2, the driving transistor T1, the write transistor T2, the first emission transistor T5, and the second emission transistor T6 may be p-type transistors. For example, the driving transistor T1, the write transistor T2, the first emission transistor T5, and the second emission transistor T6 may be the low temperature poly-silicon thin film transistors. In an embodiment, as shown in FIG. 2, the compensation transistor T3, the first initialization transistor T7, and the second initialization transistor T4 may be the oxide thin film transistors. In this case, a leakage current of the compensation transistor T3, the first initialization transistor T7, and the second initialization transistor T4 may be reduced compared to a case in which the low temperature poly-silicon thin film transistors are used as the compensation transistor T3, the first initialization transistor T7, and the second initialization transistor T4.

In an embodiment, the pixel circuit P may further include a boost capacitor Cbst including a first electrode receiving the write gate signal GW and a second electrode connected to the control electrode of the driving transistor T1. In an embodiment, the write gate signal GW may rise from a low voltage level to a high voltage level in a low voltage level period of the compensation gate signal GC. For example, the second electrode of the boost capacitor Cbst becomes a floating state when the compensation transistor T3 is turned off, and a voltage of the second electrode of the boost capacitor Cbst may be boosted by rising of the write gate signal GW from the low voltage level to the high voltage level. Accordingly, since the data voltage DATA applied to the pixel circuit P may be lowered for a same gray scale value, power consumption of the display device 1000 may be reduced.

In an embodiment, the driving transistor T1 may further include a lower electrode BML receiving a direct current voltage DC. The direct current voltage DC may be a same as the first power voltage ELVDD. For example, a bottom metal layer may be added under the driving transistor T1. In an embodiment, the lower electrode BML may overlap the control electrode of the driving transistor T1 in a plan view and include molybdenum (Mo), but is not limited thereto. In another embodiment, the lower electrode BML may be formed of a low-resistance opaque conductive material like aluminum (Al), an aluminum alloy (Al alloy), tungsten (W), copper (Cu), nickel (Ni), chromium (Cr), titanium (Ti), platinum (Pt), tantalum (Ta), etc. An electric field around the driving transistor T1 is increased by the compensating transistor T3, and an afterimage in an image may be generated by the electric field. Accordingly, by applying the direct current voltage DC to the lower electrode EML of the driving transistor T1, it is possible to prevent the afterimage.

Figure 3:
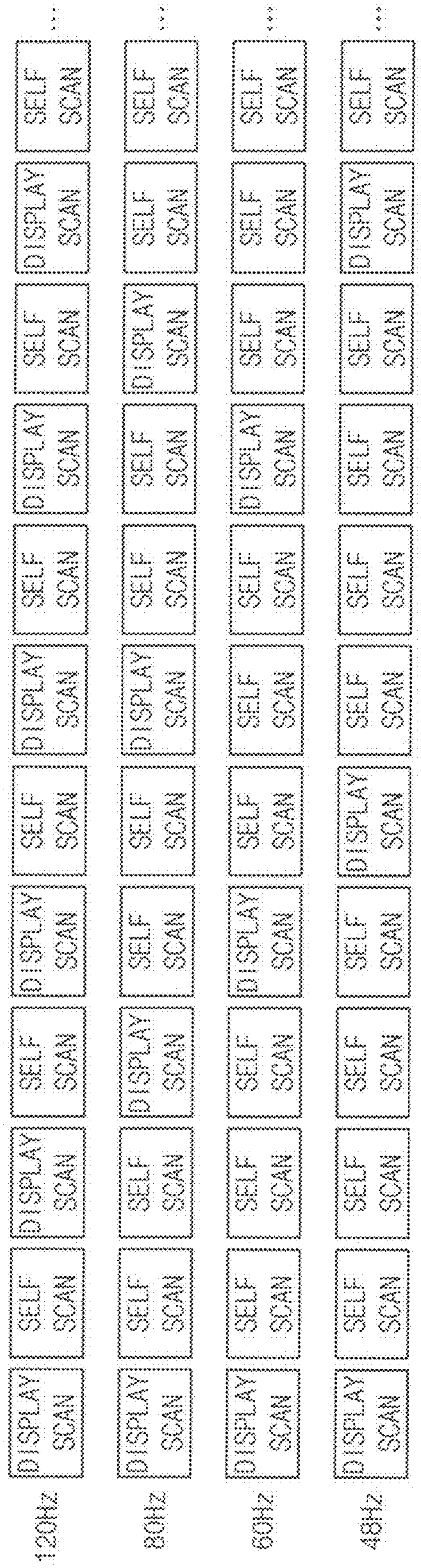
FIG. 3 is a conceptual diagram for explaining a driving operation of the display device of FIG. 1.
Figure 4:
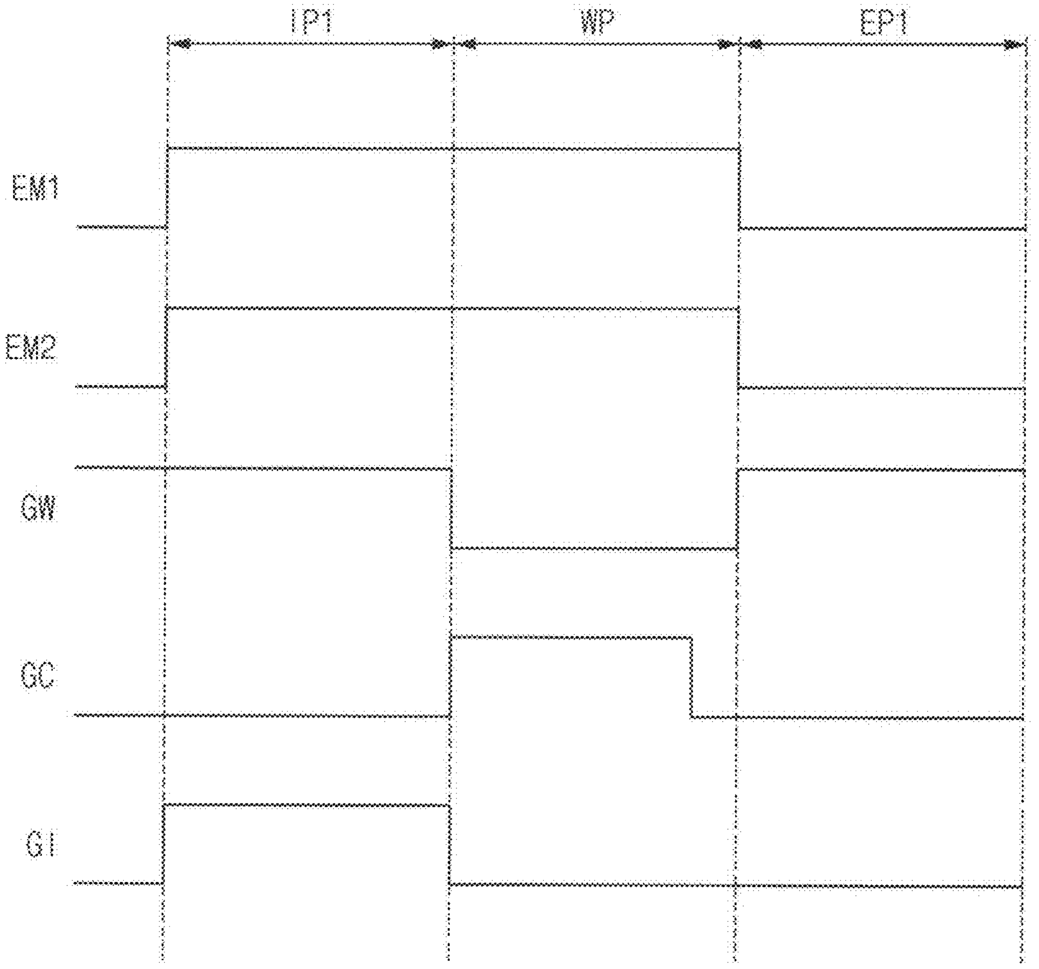
FIG. 4 is a timing diagram illustrating an example in which the display device of FIG. 1 performs a display scan operation.
Figure 5:
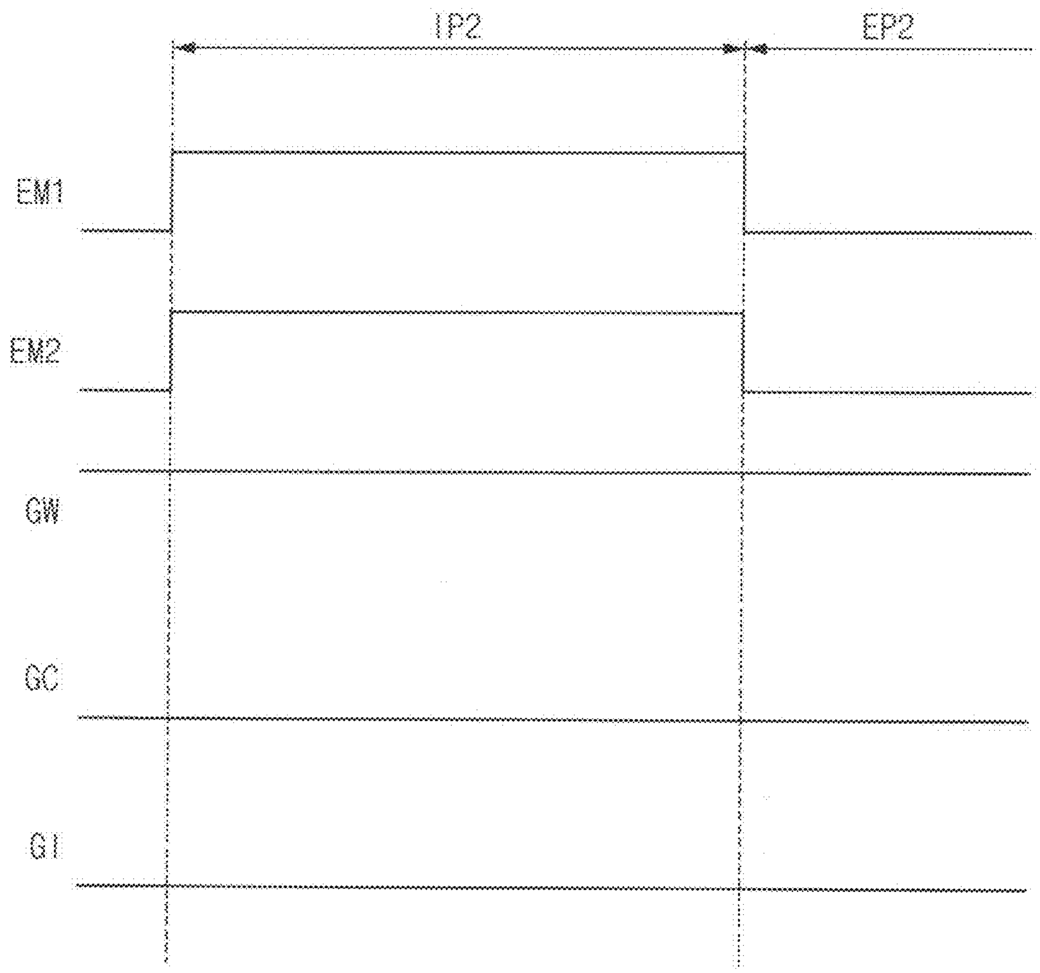
FIG. 5 is a timing diagram illustrating an example in which the display device of FIG. 1 performs a self-scan operation.

FIG. 3 is a conceptual diagram for explaining a driving operation of the display device 1000 of FIG. 1, FIG. 4 is a timing diagram illustrating an example in which the display device 1000 of FIG. 1 performs a display scan operation, and FIG. 5 is a timing diagram illustrating an example in which the display device 1000 of FIG. 1 performs a self-scan operation.

Referring to FIGS. 1 to 5, The driving controller 200 may perform a display scan operation and a self-scan operation. A data write operation during which image data are written in pixels is performed when the display scan operation is performed and a light emission operation during which image data are not written in the pixels is performed when the self-scan operation is performed. A detailed description thereof will be given later.

The driving controller 200 may perform the display scan operation in one frame and the self-scan operation in at least one frame or more depending on driving frequencies (i.e., 120 Hz, 80 Hz, 60 Hz, 48 Hz). The self-scan operation may not performed when a driving frequency of the display panel is a maximum driving frequency of the display panel 100

(i.e., in FIG. 3, it is assumed that the maximum driving frequency of the display panel 100 is 240 Hz). Specifically, when the driving frequency of the display panel 100 is 120 Hz, one driving frame which displays the same image may include one frame for the display scan operation and one frame for the self-scan operation. The one driving frame may be repeated during the display panel 100 displays images. When the driving frequency of the display panel 100 is 80 Hz, one driving frame may include one frame for the display scan operation and two frames for the self-scan operation. The one driving frame may be repeated during the display panel 100 displays images. When the driving frequency of the display panel 100 is 60 Hz, one driving frame may include one frame for the display scan operation and three frames for the self-scan operation. The one driving frame may be repeated during the display panel 100 displays images. When the driving frequency of the display panel 100 is 48 Hz, one driving frame may include one frame for the display scan operation and four frames for the self-scan operation. The one driving frame may be repeated during the display panel 100 displays images. In this way, the driving controller 200 may vary the driving frequency (or a length of the driving frame) of the display panel 100 by adjusting a length of the self-scan operation.

When the display scan operation is performed, the data voltage DATA may be written to the storage capacitor Cst (i.e., the data write operation). When the self-scan operation is performed, the data write transistor T2, the compensation transistor T3, and the second initialization transistor T4 may be turned off. Accordingly, when the self-scan operation is performed, the light emission operation may be performed without the data write operation.

For example, referring to FIGS. 2 to 4, in an initialization period IP1 of the display scan operation, the first emission signal EM1, the second emission signal EM2, and the write gate signal GW and the initialization gate signal GI may have a high voltage level period, and the compensation gate signal GC may have a low voltage level period. In this case, in the initialization period IP1 of the display scan operation, the data write transistor T2, the compensation transistor T3, the first emission transistor T5, and the second emission transistor T6 may be turned off, and the first initialization transistor T7 and the second initialization transistor T4 may be turned on. Accordingly, the first initialization voltage AVINT is applied to the anode electrode of the light emitting element EE to initialize the anode electrode of the light emitting element EE and the second initialization voltage VINT is applied to the control electrode of the driving transistor T1 to initialize the control electrode of the driving transistor T1.

For example, in a data writing period WP of the display scan operation, the first emission signal EM1, the second emission signal EM2, and the compensation gate signal GC may have the high voltage level period, and the write gate signal GW and the initialization gate signal GI may have the low voltage level period. In this case, in the data write period WP of the display scan operation, the data write transistor T2 and the compensation transistor T3 may be turned on, and the first emission transistor T5 and the second emission transistor T6, the first initialization transistor T7, and the second initialization transistor T4 may be turned off. Accordingly, a data voltage compensated by a threshold voltage of the driving transistor T1 is applied to the control electrode of the driving transistor T1 (i.e., the first electrode of the storage capacitor Cst) (i.e., the data voltage DATA compensated by the threshold voltage of the driving transistor T1 is applied to the storage capacitor Cst). Accordingly, the data voltage compensated by the threshold voltage of the driving transistor T1 may be stored in the storage capacitor Cst. In an embodiment, the second electrode of the boost capacitor Cbst becomes the floating state when the compensation transistor T3 is turned off, and a voltage of the second electrode of the boost capacitor Cbst (i.e., the data voltage compensated by the threshold voltage) may rise by rising the write gate signal GW from the low voltage level to the high voltage level.

For example, in a light emission period EP1 of the display scan operation, the write gate signal GW may have a high voltage level period, and the first emission signal EM1, the second emission signal EM2, the compensation gate signal GC, and the initialization gate signal GI may have a low voltage level period. In this case, in the light emission period EP1 of the display scan operation, the first emission transistor T5 and the second emission transistor T6 may be turned on, and the data write transistor T2, the compensation transistor T3, the first initialization transistor T7, and the second initialization transistor T4 may be turned off. Accordingly, the driving transistor T1 may generate the driving current based on a voltage of the control electrode of the driving transistor T1 and the driving current may flow to the light emitting element EE. The light emitting element EE may emit light (i.e., the light emission operation) by the driving current.

For example, referring to FIGS. 2, 3, and 5, in an initialization period IP2 of the self-scan operation, the first emission signal EM1, the second emission signal EM2, and the write gate signal GW may have a high voltage level period, and the compensation gate signal GC and the initialization gate signal GI may have a low voltage level period. In this case, in the initialization period IP2 of the self-scan operation, the data write transistor T2, the compensation transistor T3, the first emission transistor T5, the second emission transistor T6, and the second initialization transistor T4 may be turned off, and the first initialization transistor T7 may be turned on. Accordingly, the first initialization voltage AVINT may be applied to the anode electrode of the light emitting element EE to initialize the anode electrode of the light emitting element EE.

For example, in the emission period EP2 of the self-scan operation, the write gate signal GW may have a high voltage level period, and the first emission signal EM1, the second emission signal EM2, the compensation gate signal GC, and the initialization gate signal GI may have a low voltage level period. In this case, in the light emission period EP2 of the self-scan operation, the first emission transistor T5, the second emission transistor T6 may be turned on, and the data write transistor T2, the compensation transistor T3, the first initialization transistor T7, and the second initialization transistor T4 may be turned off. Accordingly, the driving transistor T1 may generate the driving current based on the voltage of the control electrode of the driving transistor T1 and the driving current may flow to the light emitting element EE. The light emitting element EE may emit light (i.e., the light emission operation) by the driving current. Accordingly, when the self-scan operation is performed, the data write operation may not be performed.

Figure 6:
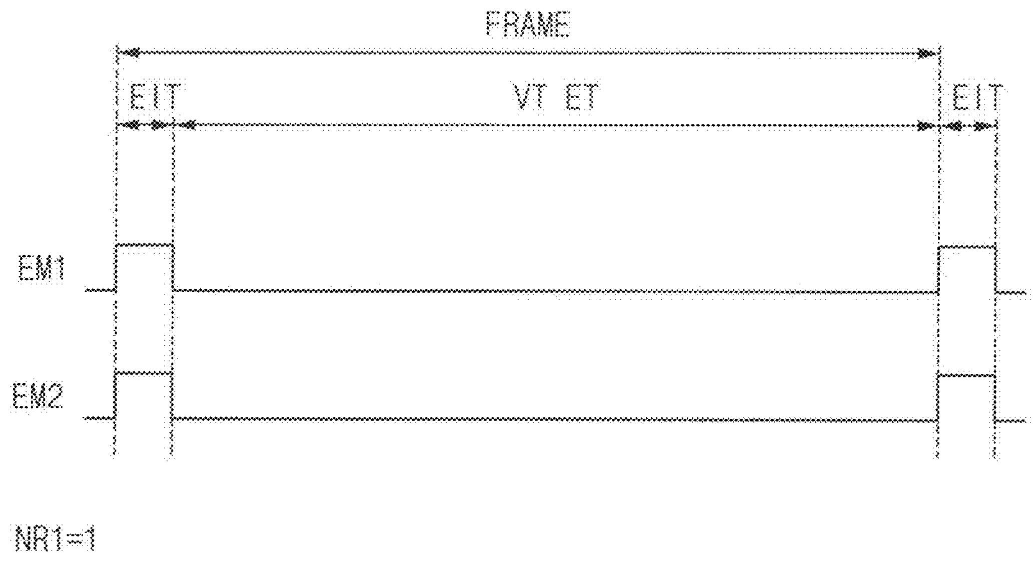
FIGS. 6 and 7 are timing diagrams illustrating examples of a first emission signal and a second emission signal of the display device of FIG. 1.
Figure 7:
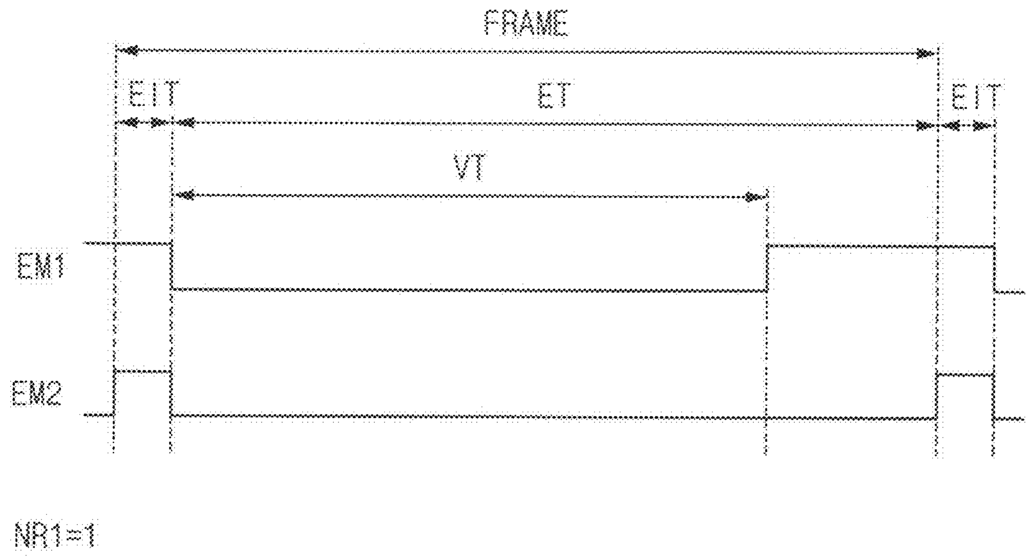

FIGS. 6 and 7 are timing diagrams illustrating examples of the first emission signal EM1 and the second emission signal EM2 of the display device 1000 of FIG. 1. A first off duty ratio in FIG. 7 is greater than the first off duty ratio in FIG. 6.

Referring to FIGS. 1, 2, 6, and 7, the driving controller 200 may adjust a voltage application time VT in which the first power voltage ELVDD is applied to the driving transistor T1 included in the pixel circuit P according to a set luminance level, and fix an light emitting time ET in which the light emitting element EE included in the pixel circuit P emits light and a light emitting element initialization time EIT in which the anode electrode of the light emitting element EE is initialized. For example, the voltage application time VT may be a time when the first emission transistor T5 is turned on, the light emitting time ET may be a time when the first emission transistor T5 and the second emission transistor T6 are simultaneously turned on, and the light emitting element initialization time EIT may be a time when the first initialization transistor T7 is turned on. Accordingly, the first off-duty ratio which is a ratio of a high voltage level period of the first emission signal EM1 in one frame is determined according to the set luminance level and a second off-duty ratio which is a ratio of a high voltage level period of the second emission signal EM2 in the one frame is fixed. For example, the first off-duty ratio may be $$\frac{\text{(time of one frame)} - \text{(voltage application time)}}{\text{(time of one frame)}},$$

and the second off-duty ration may be $$\frac{\text{(light emitting element initialization time)}}{\text{(time of one frame)}}.$$

For example, when a user sets the luminance level, the display device 1000 may determine the first off-duty ratio according to the set luminance level through a lookup table in which the first off-duty ratio corresponding to the luminance level is stored. That is, by adjusting the first off-duty ratio, the display device 1000 may adjust a luminance without adjusting the data voltage DATA. In an embodiment, the display device 1000 may determine the first off-duty ratio at representative luminance levels and the first off-duty ratios at the remaining luminance levels may be determined through an interpolation method. However, the present inventive concept is not limited thereto, and the first off-duty ratio and a grayscale voltage may be determined according to the set luminance level to adjust the luminance.

When the first off-duty ratio increases, the voltage application time VT may decrease. Accordingly, a time when the first power voltage ELVDD is applied to the driving transistor T1 may decrease and the luminance may be reduced by the reduced time. For example, when the driving controller 200 increases the first off-duty ratio, a timing at which the first emission signal EM1 rises from the low voltage level to the high voltage level may be advanced. Even when the timing of rising from the low voltage level to the high voltage level is advanced to increase the first off-duty ratio, a time from the data write operation to the light emission operation may not change.

Since the second off-duty ratio is fixed (i.e., the driving controller 200 fixes the light emitting time ET and the light emitting element initialization time EIT), a time when the first initialization voltage VAINT is applied to the light emitting element EE may be constant even when the set luminance level is changed. Accordingly, a luminance inversion phenomenon which occurs when the time to apply the first initialization voltage VAINT (i.e., the light emitting element initialization time EIT) is varied according to the set luminance level may be prevented. Also, by applying the second emission signal EM2 to the control electrode of the first initialization transistor T7, the display device 1000 may maintain the light emitting element initialization time EIT without adding a new signal (i.e., without adding a driver and a clock signal for the new signal).

In an embodiment, the number of times the first emission signal EM1 rises from the low voltage level to the high voltage level in the one frame may be a same as the number of times the second emission signal EM2 rises from the low voltage level to the high voltage level in the one frame.

For example, the number of times the first emission signal EM1 rises from the low voltage level to the high voltage level in one frame may be a first rise number NR1, and the number of times the second emission signal EM2 rises from the low voltage level to the high voltage level in the one frame may be the first rise number NR1. That is, the number of times the first emission signal EM1 and the second emission signal EM2 rise from the low voltage level to the high voltage level in one frame may be the same. As shown in FIGS. 6 and 7, assuming that the first rise number NR1 is 1, the first emission signal EM1 and the second emission signal EM1 may rise from the low voltage level to the high voltage level once in one frame.

Figure 8:
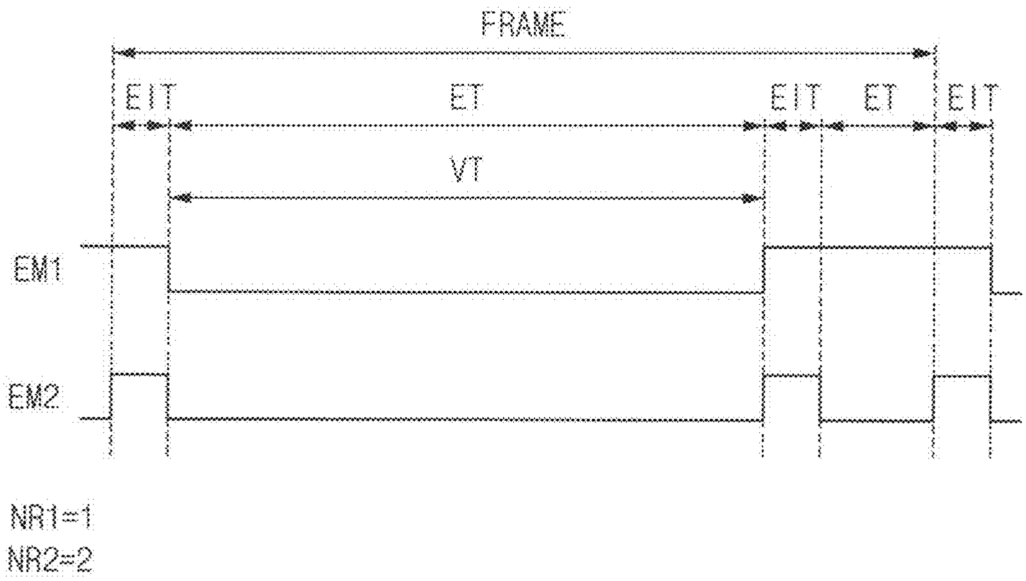
FIG. 8 is a timing diagram illustrating an example of a first emission signal and a second emission signal of a display device according to embodiments of the present inventive concept.

FIG. 8 is a timing diagram illustrating an example of the first emission signal EM1 and the second emission signal EM2 of a display device according to embodiments of the present inventive concept.

The display apparatus according to the present embodiment is substantially the same as the display device 1000 of FIG. 1 except for the number of times the first emission signal EM1 and the second emission signal EM2 rise from the low voltage level to the high voltage level. Thus, the same reference numerals are used to refer to the same or similar element, and any repetitive explanation will be omitted.

Referring to FIGS. 8, the number of times the first emission signal EM1 rises from the low voltage level to the high voltage level in the one frame may be less than the number of times the second emission signal EM2 rises from the low voltage level to the high voltage level in the one frame.

For example, the number of times the first emission signal EM1 rises from the low voltage level to the high voltage level in one frame may be the first rise number NR1 and the number of times the second emission signal EM2 rises from the low voltage level to the high voltage level in the one frame may be a second rise number NR2 greater than the first rise number NR1. That is, the number of times the first emission signal EM1 rises from the low voltage level to the high voltage level in the one frame may be less than the number of times the second emission signal EM2 rises from the low voltage level to the high voltage level in the one frame. As shown in FIG. 8, assuming that the first rise number NR1 is 1 and the second rise number NR2 is 2, the first emission signal EM1 may rise from the low voltage level to the high voltage level once in one frame and the second emission signal EM2 may rise from the low voltage level to the high voltage level twice in one frame.

In an embodiment, the second emission signal EM2 may rise from the low voltage level to the high voltage level when the first emission signal EM1 rises from the low voltage level to the high voltage level. The rising edge of the second emission signal EM2 may be synchronized with the rising edge of the first emission signal EM1. That is, when the first emission signal EM1 rises from the low voltage level to the high voltage level, the anode electrode of the light emitting element EE may be initialized. The rising edge of the second emission signal EM2 may be synchronized with the rising edge of the first emission signal EM1. That is, when the first emission signal EM1 rises from the low voltage level to the high voltage level, the anode electrode of the light emitting element EE may be initialized. When the number of times the second emission signal EM2 rises from the low voltage level to the high voltage level in the one frame is greater than 2, the last rising edge of the second emission signal EM2 may overlap with a period when the first emission signal EM1 is in a rising state. The last falling edge of the second emission signal EM2 may be synchronized with the falling edge of the first emission signal EM1. As a result, the display device 1000 may prevent peak luminance that is instantaneously generated when the first emission signal EM1 of the first emission transistor (T5 in FIG. 2) rises.

Figure 9:
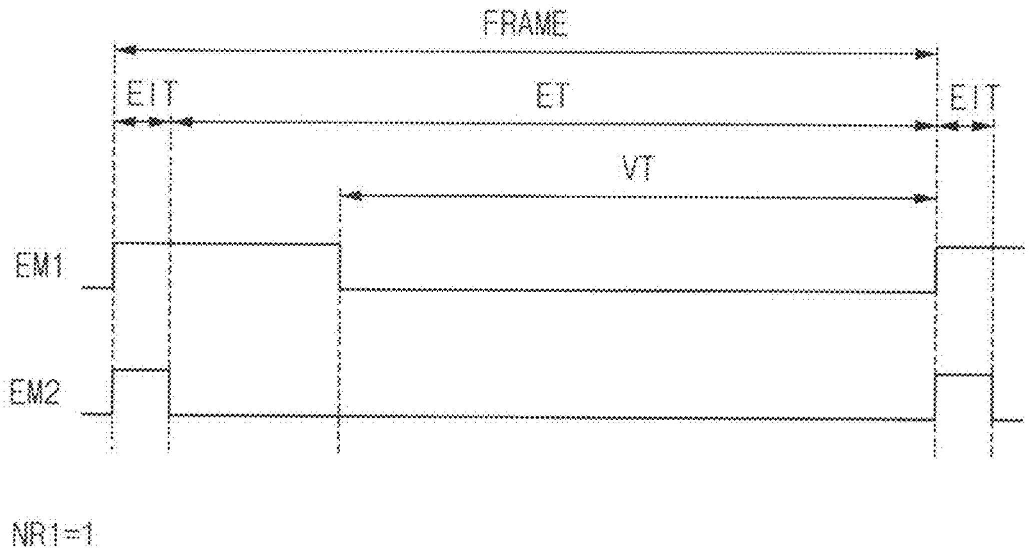
FIG. 9 is a timing diagram illustrating an example of a first emission signal and a second emission signal of a display device according to embodiments of the present inventive concept.

FIG. 9 is a timing diagram illustrating an example of the first emission signal EM1 and the second emission signal EM2 of a display device according to embodiments of the present inventive concept.

The display apparatus according to the present embodiment is substantially the same as the display device 1000 of FIG. 1 except the first emission signal EM1. Thus, the same reference numerals are used to refer to the same or similar element, and any repetitive explanation will be omitted.

Referring to FIGS. 1, 2, and 9, when the first off-duty ratio is increased, the voltage application time VT may decrease. Accordingly, a time when the first power voltage ELVDD is applied to the driving transistor T1 may be reduced and the luminance may be reduced by the reduced time. For example, when the driving controller 200 increases the first off-duty ratio, a timing at which the first emission signal EM1 falls from the high voltage level to the low voltage level may be delayed. In an embodiment, the second emission signal EM2 may rise from the low voltage level to the high voltage level when the first emission signal EM1 rises from the low voltage level to the high voltage level. The rising edge of the second emission signal EM2 may be synchronized with the rising edge of the first emission signal EM1. That is, when the first emission signal EM1 rises from the low voltage level to the high voltage level, the anode electrode of the light emitting element EE may be initialized. As a result, the display device 1000 may prevent peak luminance that is instantaneously generated when the first emission signal EM1 of the first emission transistor (T5 in FIG. 2) rises.

Figure 10:
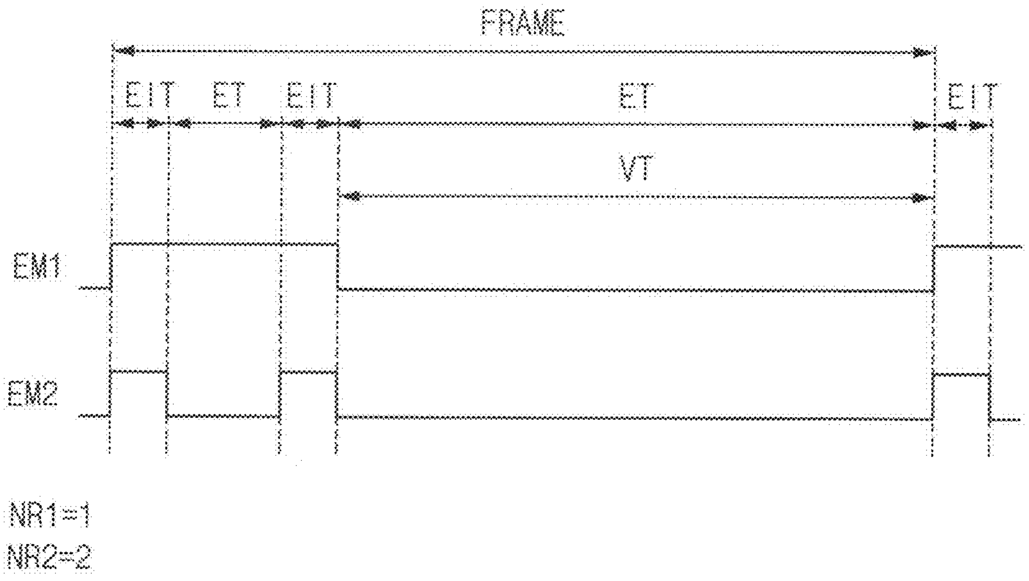
FIG. 10 is a timing diagram illustrating an example of a first emission signal and a second emission signal of a display device according to embodiments of the present inventive concept.

FIG. 10 is a timing diagram illustrating an example of the first emission signal EM1 and the second emission signal EM2 of a display device according to embodiments of the present inventive concept.

The display apparatus according to the present embodiment is substantially the same as the display device of FIG. 9 except for the number of times the first emission signal EM1 and the second emission signal EM2 rise from the low voltage level to the high voltage level. Thus, the same reference numerals are used to refer to the same or similar element, and any repetitive explanation will be omitted.

Referring to FIG. 10, the number of times the first emission signal EM1 rises from the low voltage level to the high voltage level in the one frame may be less than the number of times the second emission signal EM2 rises from the low voltage level to the high voltage level in the one frame.

For example, the number of times the first emission signal EM1 rises from the low voltage level to the high voltage level in one frame may be the first rise number NR1, and the number of times the second emission signal EM2 rises from the low voltage level to the high voltage level in the one frame may be a second rise number NR2 greater than the first rise number NR1. That is, the number of times the first emission signal EM1 rises from the low voltage level to the high voltage level in the one frame may be less than the number of times the second emission signal EM2 rises from the low voltage level to the high voltage level in the one frame. When the number of times the second emission signal EM2 rises from the low voltage level to the high voltage level in the one frame is greater than 2, the last rising edge of the second emission signal EM2 may overlap with a period when the first emission signal EM1 is in a rising state. The last falling edge of the second emission signal EM2 may be synchronized with the falling edge of the first emission signal EM1. As shown in FIG. 10, assuming that the first rise number NR1 is 1 and the second rise number NR2 is 2, the first emission signal EM1 may rise from the low voltage level to the high voltage level once in one frame, and the second emission signal EM2 may rise from the low voltage level to the high voltage level twice in one frame.

The inventive concepts may be applied to any electronic device including the display device. For example, the inventive concepts may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A pixel comprising:

a light emitting element;

a driving transistor generating a driving current;

a first emission transistor connected between a first power voltage line and the driving transistor, and applying a first power voltage to the driving transistor in response to a first emission signal;

a second emission transistor connected between the driving transistor and the light emitting element, and applying the driving current to the light emitting element in response to a second emission signal;

a first initialization transistor applying a first initialization voltage to an anode electrode of the light emitting element in response to the second emission signal;

a data write transistor applying a data voltage to the driving transistor in response to a write gate signal;

a compensation transistor connecting a first electrode of the driving transistor and a control electrode of the driving transistor in response to a compensation gate signal;

a second initialization transistor applying a second initialization voltage to the control electrode of the driving transistor in response to an initialization gate signal; and a storage capacitor including a first electrode connected to the control electrode of the driving transistor and a second electrode receiving the first power voltage, wherein the first emission signal has a first on time in one frame which is determined according to a set luminance level, the first on time corresponding to the set luminance level being stored in a look up table, and wherein the second emission signal has a second on time in the one frame which is fixed regardless of the set luminance level.

2. The pixel of claim 1, wherein the second emission transistor is a p-type transistor, and wherein the first initialization transistor is an n-type transistor.

3. The pixel of claim 1, wherein the driving transistor includes the first electrode connected to a first node, a second electrode connected to a second node, and the control electrode connected to a third node, wherein the first emission transistor includes a first electrode connected to the second node, a second electrode receiving the first power voltage, and a control electrode receiving the first emission signal, wherein the second emission transistor includes a first electrode connected to a fourth node, a second electrode connected to the first node, and a control electrode receiving the second emission signal, wherein the first initialization transistor includes a first electrode receiving the first initialization voltage, a second electrode connected to the fourth node, and a control electrode receiving the second emission signal, wherein the data write transistor includes a first electrode receiving the data voltage, a second electrode connected to the second node, and a control electrode receiving the write gate signal, wherein the compensation transistor includes a first electrode connected to the third node, a second electrode connected to the first node, and a control electrode receiving the compensation gate signal, wherein the second initialization transistor includes a first electrode receiving the second initialization voltage, a second electrode connected to the third node, and a control electrode receiving the initialization gate signal, and wherein the light emitting element includes the anode electrode connected to the fourth node and a cathode electrode receiving a second power voltage.

4. The pixel of claim 1, further comprising:

a boost capacitor including a first electrode receiving the write gate signal and a second electrode connected to the control electrode of the driving transistor.

5. The pixel of claim 1, wherein the first emission signal is an emission signal applied to the first emission transistor of an (n)th-row pixel, and the second emission signal is an emission signal applied to the first emission transistor of an (n+k)th-row pixel, where n and k are integers greater than or equal to 1.

6. The pixel of claim 1, wherein the driving transistor further includes a lower electrode receiving a direct current voltage.

7. The pixel of claim 6, wherein the direct current voltage is a same as the first power voltage.

8. The pixel of claim 1, wherein a number of times the first emission signal changes from a turn-on voltage level to a turn-off voltage level in the one frame is a same as a number of times the second emission signal changes from the turn-on voltage level to the turn-off voltage level in the one frame.

9. The pixel of claim 1, wherein a number of times the first emission signal changes from a turn-on voltage level to a turn-off voltage level in the one frame is less than a number of times the second emission signal changes from the turn-on voltage level to the turn-off voltage level in the one frame.

10. The pixel of claim 9, wherein the second emission signal changes from the turn-on voltage level to the turn-off voltage level when a first pulse of the first emission signal changes from the turn-on voltage level to the turn-off voltage level.

11. A display device comprising:

a display panel including a pixel;

a data driver applying a data voltage to the pixel;

a gate driver applying a write gate signal, a compensation gate signal, and an initialization gate signal;

an emission driver applying a first emission signal and a second emission signal; and a driving controller controlling the display panel, the data driver, the gate driver, and the emission driver, and wherein the pixel includes:

a first emission transistor connected between a first power voltage line and a driving transistor, and applying a first power voltage to the driving transistor in response to the first emission signal; and a second emission transistor connected between the driving transistor and a light emitting element, and applying a driving current generated by the driving transistor to the light emitting element in response to a second emission signal, wherein the driving controller adjusts voltage application time in which a first power voltage is applied to a driving transistor included in the pixel according to a set luminance level and fixes light emitting time in which a light emitting element included in the pixel emits light regardless of the set luminance level, and wherein the first emission signal has a first on time in one frame and the second emission signal has a second on time in the one frame, the first on time corresponding to the set luminance level being stored in a lookup table.

12. The display device of claim 11, wherein the pixel comprises:

the light emitting element;

the driving transistor generating a driving current;

a first emission transistor applying the first power voltage to the driving transistor in response to the first emission signal;

a second emission transistor applying the driving current to the light emitting element in response to the second emission signal;

a first initialization transistor applying a first initialization voltage to the anode electrode of the light emitting element in response to the second emission signal;

a data write transistor applying the data voltage to the driving transistor in response to the write gate signal;

a compensation transistor connecting a first electrode of the driving transistor and a control electrode of the driving transistor in response to the compensation gate signal;

a second initialization transistor applying a second initialization voltage to the control electrode of the driving transistor in response to the initialization gate signal; and a storage capacitor including a first electrode connected to the control electrode of the driving transistor and a second electrode receiving the first power voltage.

13. The display device of claim 11, wherein the driving controller adjusts the voltage application time by determining a first off-duty ratio which is a ratio of a turn-off voltage level period of the first emission signal in one frame according to the set luminance level, and fixes the light emitting time and the light emitting element initialization time by fixing a second off-duty ratio which is a ratio of a turn-off voltage level period of the second emission signal in the one frame.

14. The display device of claim 13, wherein a number of times the first emission signal changes from a turn-on voltage level to a turn-off voltage level in the one frame is a same as a number of times the second emission signal changes from the turn-on voltage level to the turn-off voltage level in the one frame.

15. The display device of claim 13, wherein a number of times the first emission signal changes from a turn-on voltage level to a turn-off voltage level in the one frame is less than a number of times the second emission signal changes from the turn-on voltage level to the turn-off voltage level in the one frame.

16. The display device of claim 15, wherein the second emission signal changes from the turn-on voltage level to the turn-off voltage level when a first pulse of the first emission signal changes from the turn-on voltage level to the turn-off voltage level.

17. The display device of claim 11, wherein the pixel further includes:

a boost capacitor including a first electrode receiving the write gate signal and a second electrode connected to the control electrode of the driving transistor.

18. The display device of claim 11, wherein the first emission signal is an emission signal applied to the first emission transistor of an (n)th-row pixel, and the second emission signal is an emission signal applied to the first emission transistor of an (n+k)th-row pixel, where n and k are integers greater than or equal to 1.

19. The display device of claim 11, wherein the driving controller further fixes light emitting element initialization time in which an anode electrode of the light emitting element is initialized regardless of the set luminance level.

20. An electronic device comprising:

a processor configured to provide image data to a display device and to control the display device to display an image based on the image data;

a display panel including a pixel;

a data driver applying a data voltage to the pixel;

a gate driver applying a write gate signal, a compensation gate signal, and an initialization gate signal;

an emission driver applying a first emission signal and a second emission signal; and a driving controller controlling the display panel, the data driver, the gate driver, and the emission driver, wherein the pixel includes:

a first emission transistor connected between a first power voltage line and a driving transistor, and applying a first power voltage to the driving transistor in response to the first emission signal; and a second emission transistor connected between the driving transistor and a light emitting element, and applying a driving current generated by the driving transistor to the light emitting element in response to a second emission signal, wherein the driving controller adjusts voltage application time in which a first power voltage is applied to a driving transistor included in the pixel according to a set luminance level and fixes light emitting time in which a light emitting element included in the pixel emits light regardless of the set luminance level, and wherein the first emission signal has a first on time in one frame and the second emission signal has a second on time in the one frame, the first on time corresponding to the set luminance level being stored in a lookup table.

* * * * *